(12) United States Patent
Fujita

(10) Patent No.: US 6,509,922 B2
(45) Date of Patent: Jan. 21, 2003

(54) SOLID SCANNING OPTICAL WRITING DEVICE, AND LIGHT AMOUNT CORRECTION METHOD AND LIGHT AMOUNT MEASURING DEVICE THEREFOR

(75) Inventor: Atsushi Fujita, Kusatsu (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/735,752

(22) Filed: Dec. 13, 2000

(65) Prior Publication Data

US 2001/0006212 A1 Jul. 5, 2001

(30) Foreign Application Priority Data

Dec. 14, 1999 (JP) .......................................... 11-354948

(51) Int. Cl.[7] ............................................... B41J 2/435
(52) U.S. Cl. ....................................... 347/236; 347/246
(58) Field of Search ................................ 347/130, 136, 347/237, 238, 236, 246, 247, 240; 358/298, 505

(56) References Cited

U.S. PATENT DOCUMENTS

| 5,450,230 A | 9/1995 | Masuda et al. ............. 359/254 |
| 5,684,568 A | 11/1997 | Ishikawa et al. .............. 355/68 |
| 5,790,240 A | 8/1998 | Ishikawa et al. .............. 355/68 |
| 5,812,176 A | * | 9/1998 | Kawabe et al. ............. 347/240 |
| 6,201,559 B1 | * | 3/2001 | Wada et al. ................. 347/236 |

* cited by examiner

Primary Examiner—Hai Pham
(74) Attorney, Agent, or Firm—Sidley Austin Brown & Wood LLP

(57) ABSTRACT

In a solid scanning optical writing device that writes images on a photoreceptor by turning ON/OFF many light shutter elements aligned in an alternating fashion in two rows in the main scanning direction, single-row illumination and double-row illumination of the light shutter elements are alternately performed on a time sharing basis prior to the image writing in order to perform high-quality light amount correction. The positions of the light shutter elements are identified from the light amount data obtained from single-row illumination, and the transmitted light amount for each light shutter element during double-row illumination is sought from the light amount data obtained from double-row illumination. Calculation for shading correction is then performed from these sets of data.

9 Claims, 13 Drawing Sheets positions of light shutter elements → positions of light shutter elements →

SOLID SCANNING OPTICAL WRITING DEVICE, AND LIGHT AMOUNT CORRECTION METHOD AND LIGHT AMOUNT MEASURING DEVICE THEREFOR

This application is based on application No. JP 11-354948 filed in Japan, the contents of which are hereby incorporated by reference.

BACKGROUND OF THE INVENTION

1. Field of the Invention

The present invention relates to an improved solid scanning optical writing device, as well as a light amount correction method and light amount measuring device therefor, which are used to write images (latent images) on a photoreceptor using a PLZT light shutter array or an LED array.

2. Description of the Related Art

Various optical writing devices that turn ON/OFF light for each pixel using a PLZI light shutter array or LED array have conventionally been proposed as a device to form images (latent images) on photosensitive paper using a silver halide photosensitive material, film or electrophotographic photoreceptor. For example, as shown in FIG. 12(A), in the case of an optical writing head comprising many light shutter elements 31a and 31b aligned in alternating fashion in two rows in the main scanning direction, an image for one line is formed in the following manner.

First, the light shutter elements 31a of one row are controlled to turn ON/OFF based on the image data, and consequently, the light from the light source is turned ON/OFF. As a result, the surface of the photosensitive paper, etc. being conveyed is exposed and an image (latent image) is formed.

When the area of the photosensitive paper on which the image has been formed reaches the exposure position for the light shutter elements 31b of the other row, the light shutter elements 31b of the other row are controlled to turn ON/OFF based on the image data, whereupon the light from the light source is turned ON/OFF and an image is formed on the surface of the photosensitive paper. Through this operation, the intermittent image formed by the turning ON/OFF of the light shutter elements 31a and the intermittent image formed by the turning ON/OFF of the light shutter elements 31b are combined, and an image for one line is formed.

Incidentally, PLZT light shutter arrays and LED arrays cause line noise in the output image due to the variations in the amount of light passing through each optical element or the amount of light emitted. In order to eliminate this noise, the variations in the light amount are corrected by performing correction calculation based on information obtained through measurement of either the darkness of the output image or the amount of light from the light shutter array (shading).

Because it is relatively easy to reduce the cost and make the measuring device small in size, a method that directly measures the light amount from the light shutter array is preferred. However, it is not easy to accurately measure the light amount for each pixel when the pixel density is 400dpi, and to match the information to the image.

For example, in the case of the optical writing head shown in FIG. 12(A), if the light amount is measured with all of the light shutter elements 31a and 31b of double-rows ON, i.e., illuminated (double-row illumination) in order to measure the light amount per pixel when the light shutter elements 31a and 31b of double-rows are ON, a light amount distribution waveform shown in FIG. 12(B) is obtained. However, in order to identify the position (address) of each light shutter element 31a and 31b in such a light amount distribution waveform, an expensive device such as a linear scale in which absolute addresses are defined must be used. Alternatively, where an expensive device such as a linear scale is not used, the position of each light shutter element 31a and 31b is identified by measuring the light amount for each light shutter element when only either row is illuminated (single-row illumination) and obtaining a light amount distribution waveform shown in FIG. 12(C). The light amount for each pixel when the light shutter elements 31a and 31b of double-rows are illuminated is calculated by means of such processing methods as adding the light amount values measured per row. However, since this state in which only a single-row is illuminated is different from the original state in which double-rows are illuminated, strictly speaking, errors will occur in the light amount value between when the light amount measurement is performed and when actual exposure is carried out, resulting in image unevenness.

When a light shutter array, etc. is used for an optical writing head in actuality, it is often used in combination with image forming lenses (selfoc lens arrays) due to such issues as efficiency in the use of light and the need to ensure the distance to the exposure surface. FIG. 12(A) shows the positional relationship between a selfoc lens array and the light shutter elements 31a and 31b of a PLZT light shutter array. The selfoc lens array comprises multiple rod lenses 35a that are combined such that one lens is placed between two lenses lengthwise, and the output light from each light shutter element 31a and 31b is formed into an image on the exposure surface via their corresponding rod lenses 35a.

In the construction described above, the factors that hinder the uniformity of exposure when all of the light shutter elements are illuminated include (i) errors in the alignment of the light shutter elements formed on the PLZT light shutter chips (processing errors), (ii) positioning errors when the multiple light shutter chips are mounted on a substrate comprising glass or other materials, (iii) optical performance errors for each rod lens 35a of the selfoc lens array (depth of focus, chromatic aberration, rod lens alignment accuracy, etc.), and (iv) errors in the geometrical positioning of the light shutter elements 31 and the rod lenses 35a (assembly errors). Among these types of errors, errors in the optical performance of each rod lens 35a are the most significant, and often comprise the main reason for variations in light amount.

These errors cause a phase difference between the light amount distribution waveform obtained when only the light shutter elements 31a of one row are illuminated (curve L1) and the light amount distribution waveform obtained when only the light shutter elements 31b of the other row are illuminated (curve L2). In the presence of such a phase difference, the amplitude of the light amount distribution waveform when the light shutter elements 31a and 31b of double-rows are illuminated (curve L3) increases, resulting in so-called oscillation. For comparison purposes, FIG. 13(B) shows the light amount distribution waveforms in each case under ideal conditions in which there is no phase difference. In other words, even if the transmitted light amounts for each light shutter element 31a and 31b are adjusted such that they are all the same when the rows are separately illuminated, the oscillation itself that occurs when double-rows are illuminated cannot be reduced.

OBJECTS AND SUMMARY

The present invention was created in view of the situation described above. An object of the present invention is to provide an improved solid scanning optical writing device and light amount measuring device and driving method therefor. Another object of the present invention is to provide (i) a solid scanning optical writing device having an improved light amount adjustment function, and (ii) an improved light amount adjustment method in the above device, and more particularly, to provide a solid scanning optical writing device, light amount correction method and light amount measuring device therefor that can essentially accurately measure the output light amount for each optical element and perform high-quality light amount correction based on the measurement data.

In order to attain these and other objects, the solid scanning optical writing device according to one aspect of the present invention comprises a solid scanning optical writing device that controls the many optical elements aligned in an alternating fashion in two rows in the main scanning direction to turn them ON/OFF based on the image data, wherein said device has a light amount measuring unit that includes a light amount sensor to measure the output light amount transmitted by each optical element, and that measures the output light amount and the position of each optical element by alternately performing single-row illumination of the optical elements and double-row illumination of the optical elements on a time sharing basis while the light amount measuring unit is moved in the main scanning direction.

The light amount measuring device according to one aspect of the present invention comprises a light amount measuring unit including a light amount sensor to measure the output light amount for each of the many optical elements aligned in an alternating fashion in two rows, a means to move the light amount measuring unit forward and backward in the direction of alignment of the optical elements, and a means to adjust the position of the light amount measuring unit, wherein single-row illumination of the optical elements and double-row illumination of the optical elements are alternately performed on a time sharing basis while the light amount measuring unit is moved in the main scanning direction, and the output light amount and the position of each optical element are measured.

The light amount correction method for the solid scanning optical writing device according to one aspect of the present invention is a light amount correction method for the solid scanning optical writing device that controls many optical elements aligned in an alternating fashion in two rows in the main scanning direction to turn them ON/OFF based on the image data, said method comprising (i) a light amount measuring process in which single-row illumination of the optical elements and double-row illumination of the optical elements are performed alternately on a time sharing basis, and the position and output light amount for each optical element are measured while the light amount measuring unit is moved in the main scanning direction, and (ii) a light amount correction process in which the correction amount for the output light amount for each optical element is calculated based on the data regarding the optical element output amount data obtained in the previous light amount measuring process. More specifically, the output signals from the light amount sensor of the light amount measuring unit are sampled in synchronization with the timing for the time-shared driving, and from among the data obtained by means of the sampling, the position of a prescribed optical element is specified from the amplitude of the sampling data when all of the optical elements of a single-row were illuminated, and the data from one sample before or after the sample by which the position of the optical element was specified is deemed the output light amount for the optical element when all of the optical elements of both rows are illuminated.

Using the method described above, the position of a prescribed optical element may be specified from the amplitude of the light amount data during single-row illumination, and the output light amount for the optical element during double-row illumination, the position of which has been specified, may be obtained from the light amount data during double-row illumination. As a result, the output light amount for each optical element may be essentially accurately measured, and high-quality shading correction (correction for variations in light amount) may be performed.

In addition, the light amount correction method for the solid scanning optical writing device according to another aspect of the present invention measures the position and output light amount for each optical element using the light amount correction method having the characteristics described above, detects the difference in output light amount between adjacent optical elements from the output light amount data for each optical element during double-row illumination, and calculates the correction amount for the output light amount for each optical element based on this difference in output light amount. In this case, it is preferred that the correction amount for the output light amount for each optical element based on the difference in output light amount be calculated by adding at least one of the following parameters: (i) the visual characteristic of the output image in a dark image area, (ii) the visual characteristic of the output image in a halftone image area, and (iii) the visual characteristic of the output photosensitive material.

Using the method described above, the oscillation areas in the light amount distribution waveform during double-row illumination due to the phase difference between the two rows of optical elements caused by the optical performance errors of the selfoc lens array may be detected through repeated light amount measurement, and the output light amount for each optical element is re-corrected by adding such parameters as the visual characteristic of the output image in terms of darkness. Consequently, even if the oscillation areas and the other areas (uniform areas) are adjacent to each other or coexist in a mixed fashion, uniform and even images may be obtained.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION OF THE PREFERRED EMBODIMENTS

The solid scanning optical writing device and light amount correction method and the light amount measuring device therefor pertaining to the present invention are explained below with reference to the accompanying drawings.

Optical Writing Head

Figure 1:
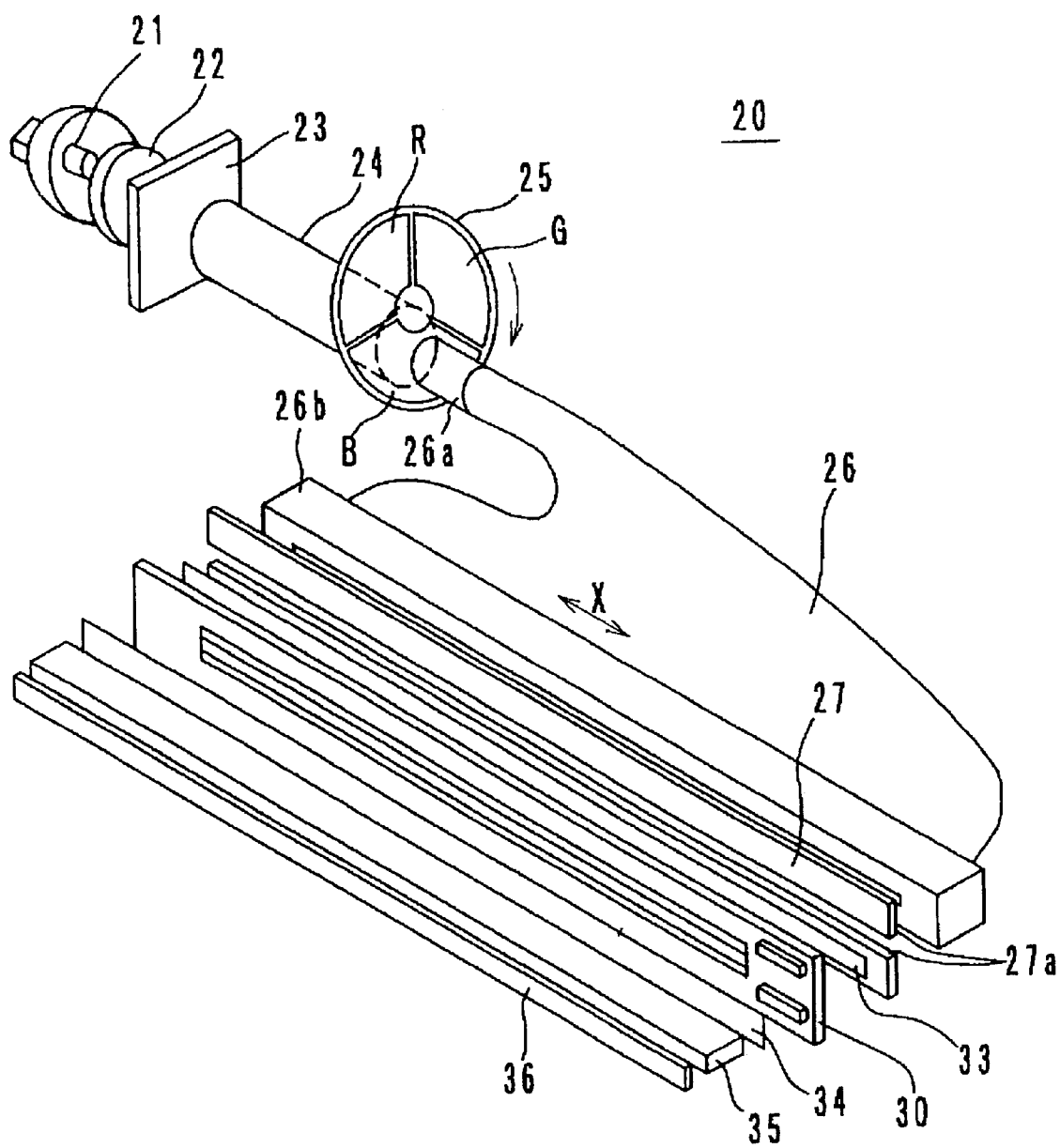
FIG. 1 is a perspective view showing one embodiment of the optical writing device pertaining to the present invention.

FIG. 1 shows an optical writing head 20 by which to write color images on photosensitive paper that uses a silver halide photosensitive material. This optical writing head 20 essentially comprises a halogen lamp 21, a heat-proofing filter 22, a color correction filter 23, a diffusion cylinder 24, an RGB filter 25, an optical fiber array 26, a slit plate 27, a light shutter module 30, an image forming lens array (selfoc lens array) 35, and a dust-proof glass plate 36.

The light emitted from the halogen lamp 21 is deprived of the heat rays by means of the heat-proofing filter 22, and is adjusted by means of the color correction filter 23 so that the light quality of the light matches the spectral sensitivity characteristic of the photosensitive paper. The diffusion cylinder 24 improves the use efficiency of the light and reduces the unevenness in light amount. The RGB filter 25 is driven to rotate in synchronization with the writing by means of the light shutter module 30 described below, and changes the transmitted color for each line.

The optical fiber array 26 comprises a large number of optical fibers, which are bound at one end 26a and face the diffusion cylinder 24 via the RGB filter 25. The fibers at the other end 26b are aligned in the main scanning direction indicated by an arrow x and emit light in a linear configuration. The slit end surfaces 27a of the slit plate 27 are mirror-finished, and efficiently lead the light emitted from the optical fiber array 26 to the light shutter module 30. Further, a heater (not shown in the drawing) to maintain the PLZT shutter chips at a certain temperature is located on the slit plate 27, and temperature control is performed based on the detection results obtained from the temperature detecting element (not shown in the drawing) located on the module 30.

The light shutter module 30 comprises an array of multiple light shutter chips made of PLZT aligned in a slit-like opening of a ceramic substrate or on a glass substrate, as well as driver ICs located next to the chips. The light shutter elements 31a and 31b formed on each light shutter chip are aligned in an alternating fashion in two lines in the main scanning direction X (i.e., an odd numbered row and even numbered row)(see FIG. 3). Only those light shutter elements 31a and 31b that correspond to prescribed pixels are driven by the driver ICs based on the image data. In addition, a polarizer 33 and an analyzer 34 are located before and after the module 30, respectively. The polarizer 33 is located such that it is angled by 45 degrees relative to the magnetic field of the light shutter elements 31a and 31b. The analyzer 34 is arranged in a cross-Nicoled fashion relative to the polarizer 33.

PLZT is a light-permeable ceramic substance having an electrooptical effect with a large Kerr constant, as is well known. Even if the light that has undergone linear polarization by the polarizer 33 strikes the module 30, when no electric field is being applied to the light shutter elements 31a and 31b, the light is shielded by the analyzer 34 and is not allowed to pass through.

However, if an electric field is applied to the light shutter elements 31a and 31b, the plane of polarization of the incident light may be rotated, and the most intense light passes through the analyzer 34 when the plane of polarization is rotated by 90 degrees. The voltage applied to the light shutter elements 31a and 31b when this occurs is termed the half-wavelength voltage. The rotation of the plane of polarization is caused by the turning ON/OFF of the electric field generated by this half-wavelength voltage, and the light emitted from the analyzer 34 is turned ON/OFF.

The light emitted from the analyzer 34 forms images on the photosensitive paper via the image forming lens array 35 and the dust-proof glass plate 36, and forms a latent image. The photosensitive paper is conveyed at a constant speed in the direction perpendicular to the main scanning direction X (i.e., in the secondary scanning direction).

Light Amount Measuring Device and Measuring Method

Figure 2:
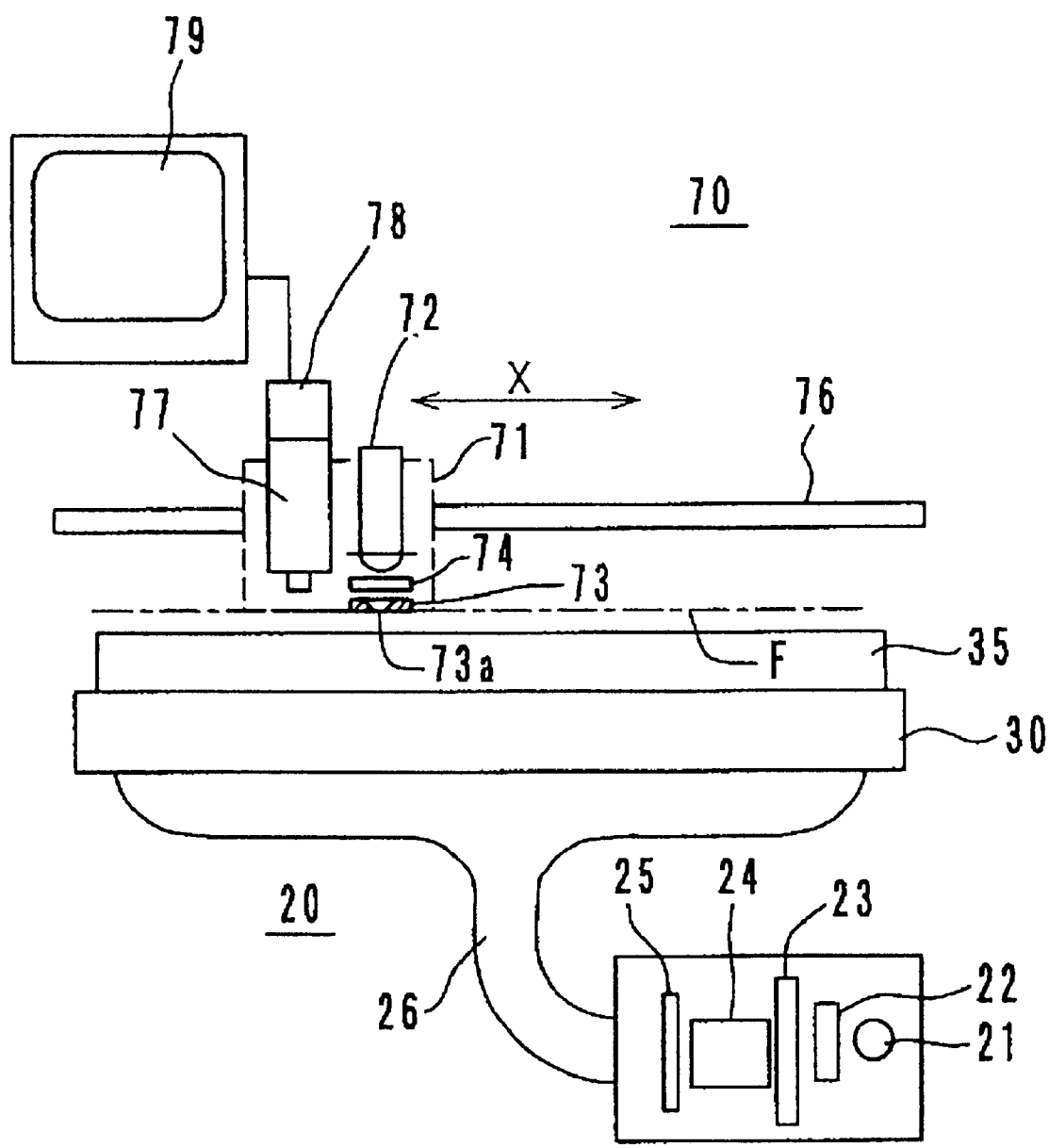
FIG. 2 is a basic construction drawing showing the light amount measuring device.

FIG. 2 shows the measuring device 70 that measures the light amount for each light shutter element of the optical writing head 20.

This measuring device 70 comprises a light amount sensor 72 to measure the output light amount for the light shutter elements 31a and 31b, and a measuring unit 71 having a tool maker's microscope 77, both of which are attached to a guide rod 76 such that they can slide. The guide rod 76 is located parallel to the main scanning direction of the light shutter module 30 (the direction of the arrow X), such that the measuring unit 71 moves forward and backward at a constant speed in the direction indicated by the arrow X with the light amount sensor 72 positioned directly above the light shutter elements 31a and 31b.

A light receiving unit mask 73 and a light diffusion plate 74 are located on the light entry side of the light amount sensor 72. The light receiving unit mask 73 has an open slit 73a. This opening width in the main scanning direction X of this open slit 73a is essentially equal to the width of one light shutter element 31a (or 31b) in the main scanning direction X, and the opening in the secondary scanning direction has a length that includes the two rows of the light shutter elements 31a and 31b (the odd numbered row and the even numbered row), which are aligned in an alternating fashion, (see FIG. 3). Based on this construction, the amount of light leaking from the gap between the light shutter elements 31a and 31b may be detected, which allows for more accurate light amount correction. The light receiving unit mask 73 is located on the focusing plane F of the image forming lens array 35. For the light amount sensor 72, a sensor having a spectral sensitivity characteristic essentially equal to or larger than that of the recording medium is used.

The tool maker's microscope 77 is integrated with a CCD camera 78. The images of the light shutter elements are captured by the CCD camera 78 via the tool maker's microscope 77, and are displayed on a monitor screen 79. The optical writing head 20 is mounted by means of a mounting table not shown in the drawings so that its height and angle relative to the light amount sensor 72, as well as its distance therefrom, may be adjusted. The operator makes fine adjustments (focusing and position adjustments) for the optical writing head 20 at either end of the light shutter elements while viewing the images on the monitor screen 79. At the time of shipment from the factory, the tool maker's microscope 77, CCD camera 78 and monitor screen 79 are usually removed.

The light amount measuring device 70 having the above construction and the optical writing head 20 are controlled by means of a sequencer, and the timing for forward and backward movement and the light amount measurement by the measuring unit 71 are controlled. The optical writing head 20 is driven in the pre-programmed drive mode (drive frequency, illumination duty, flash data). The measuring device 70 is constructed such that it obtains the light amount for each light shutter element in synchronization with this drive. Ordinarily, setting is made such that multiple sampling sessions are carried out per element based on the relationship between the drive frequency and the drive speed of the light amount sensor 72.

Figure 4:
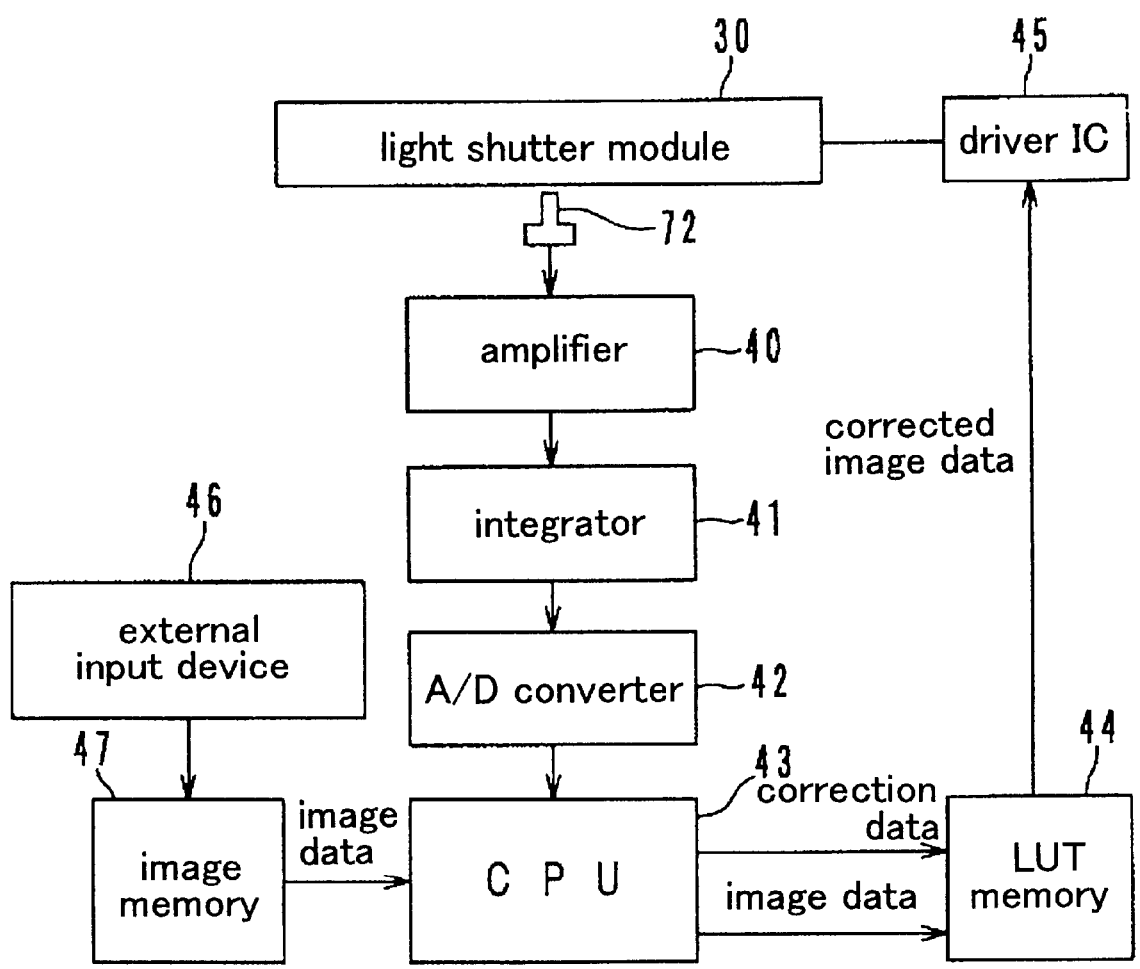
FIG. 4 is a block diagram of the light amount measuring and data processing circuits.
Figure 5:
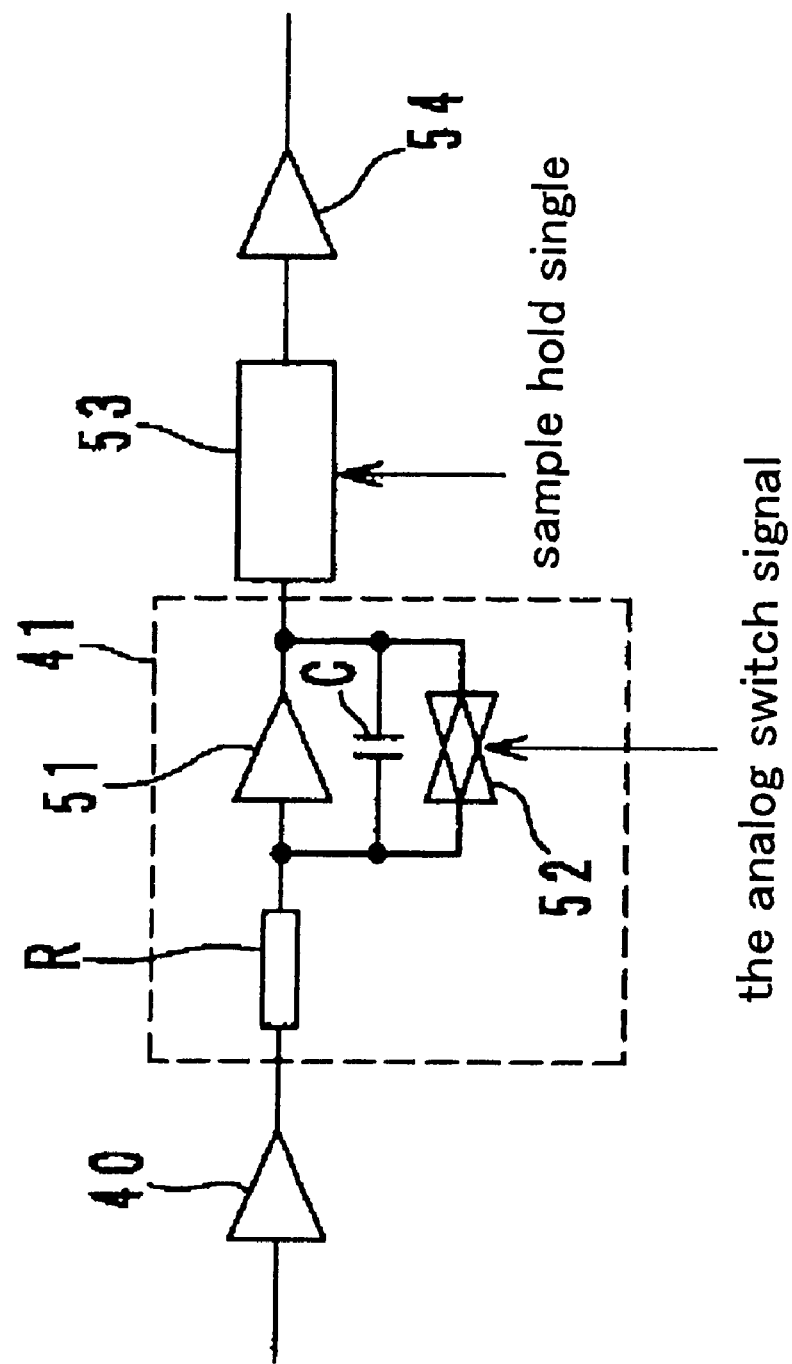
FIG. 5 is an electrical circuitry diagram of the light receiving circuit shown in FIG. 4.

FIG. 4 is a block diagram of the light amount measuring and data processing circuits. FIG. 5 is an electrical circuit diagram of the light receiving circuit. The analog light amount signal output from the light amount sensor 72 is amplified by the polarity reversing amplifier 40, and is then integrated by the integrator 41. The integrator 41 comprises, as shown in FIG. 5, a resister R, a polarity reversing amplifier 51, a condenser C, and an analog switch 52. In the next step, the analog light amount signal output from the integrator 41 is transmitted to the A/D converter 42 via the sample hold circuit 53 and buffer amplifier 54, and is then converted into a digital signal by the A/D converter 42. The digital light amount signal thus sampled is transmitted to the CPU 43, where necessary processing is performed. The shading correction data obtained for each light shutter element 31a and 31b is stored in the look-up table memory (LUT memory) 44.

After light amount measurement and correction (calibration) for the light shutter elements 31a and 31b are carried out in this way, image printing is performed. In other words, the image data called out from the image memory 47 by the CPU 43 is corrected based on the shading correction data stored in the LUT memory 44. This image data is data that was read by an external input device 46 such as a scanner or digital camera, and then temporarily stored in the image memory 47. The corrected image data is transmitted to the driver IC 45 that drives the light shutter module 30, whereupon only the light shutter elements 31a and 31b that correspond to prescribed pixels are driven based on the corrected image data.

Figure 6:
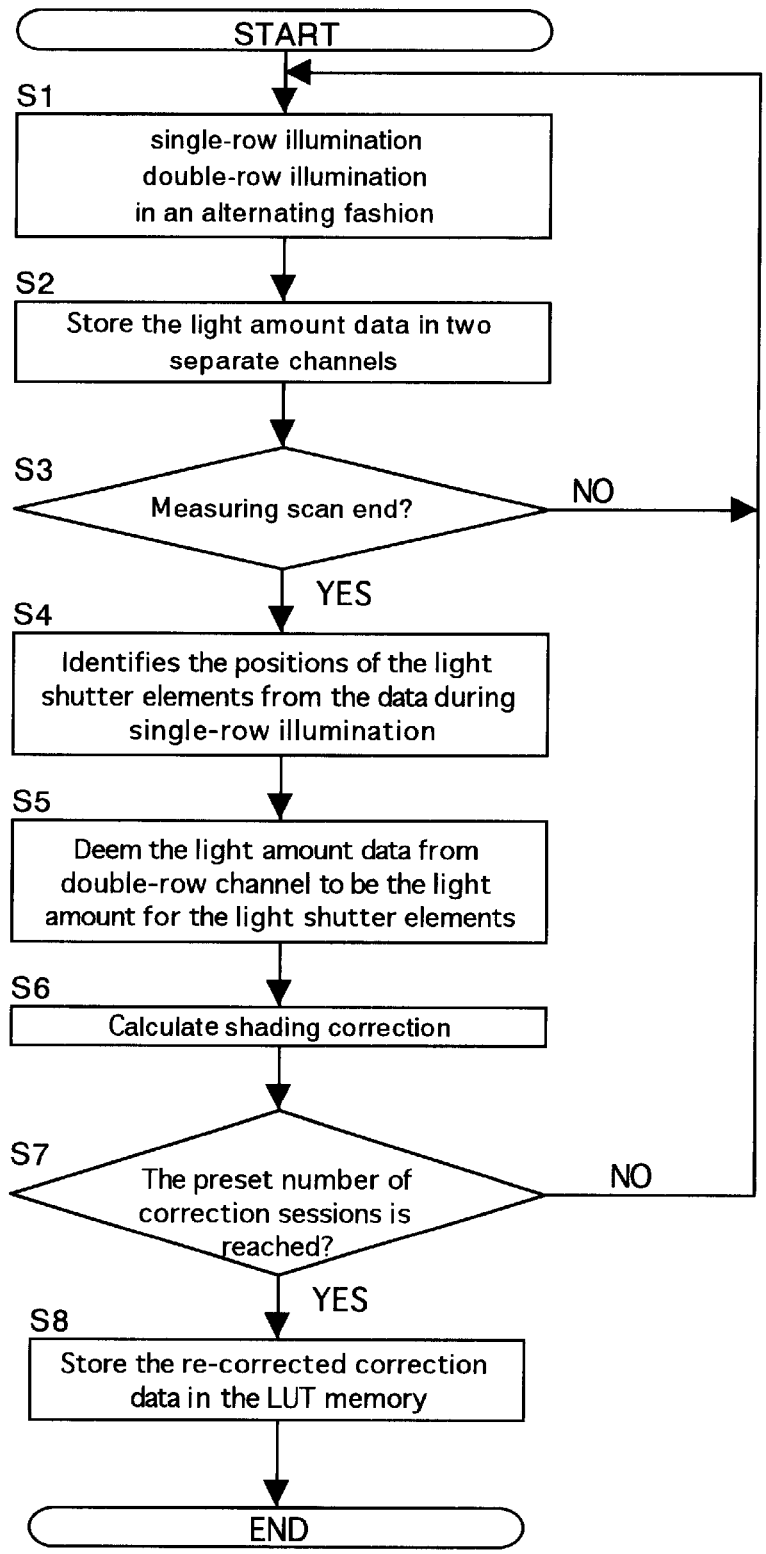
FIG. 6 is a flow chart showing the correction algorithm for the variation in light amount during light amount measurement.
Figure 7:
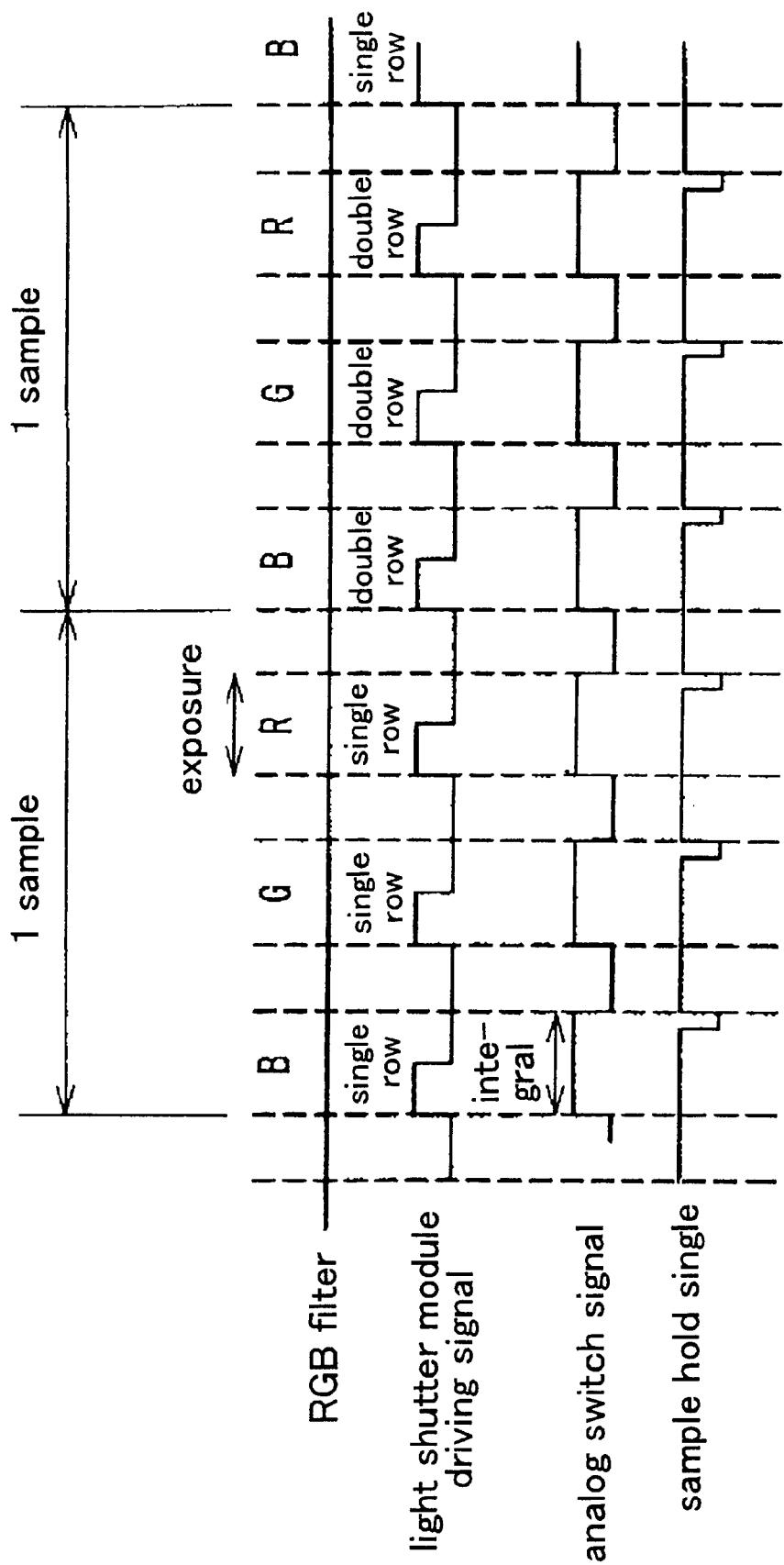
FIG. 7 is a timing chart during light amount measurement.

The light amount correction method will now be explained with reference to FIGS. 6 and 7. FIG. 6 is a flow chart for light amount measurement and shading correction, and FIG. 7 is a timing chart during light amount measurement.

The measurement of data used for light amount correction is carried out when the power supply for the printer is turned ON. First, in step S1 of FIG. 6, the RGB filter 25 is driven to rotate, and the measurement for the three colors in one gradation is deemed one routine. The light shutter module 30 is then driven according to the timing chart shown in FIG. 7 while the light amount sensor 72 is moved from the initial position outside the scanning area of the light shutter elements 31a and 31b, so that all light shutter elements 31a of the odd numbered row only (single-row illumination) and all light shutter elements 31a and 31b of both the odd numbered row and the even numbered row (double-row illumination) are illuminated in an alternating fashion based on a time sharing basis.

Figure 3:
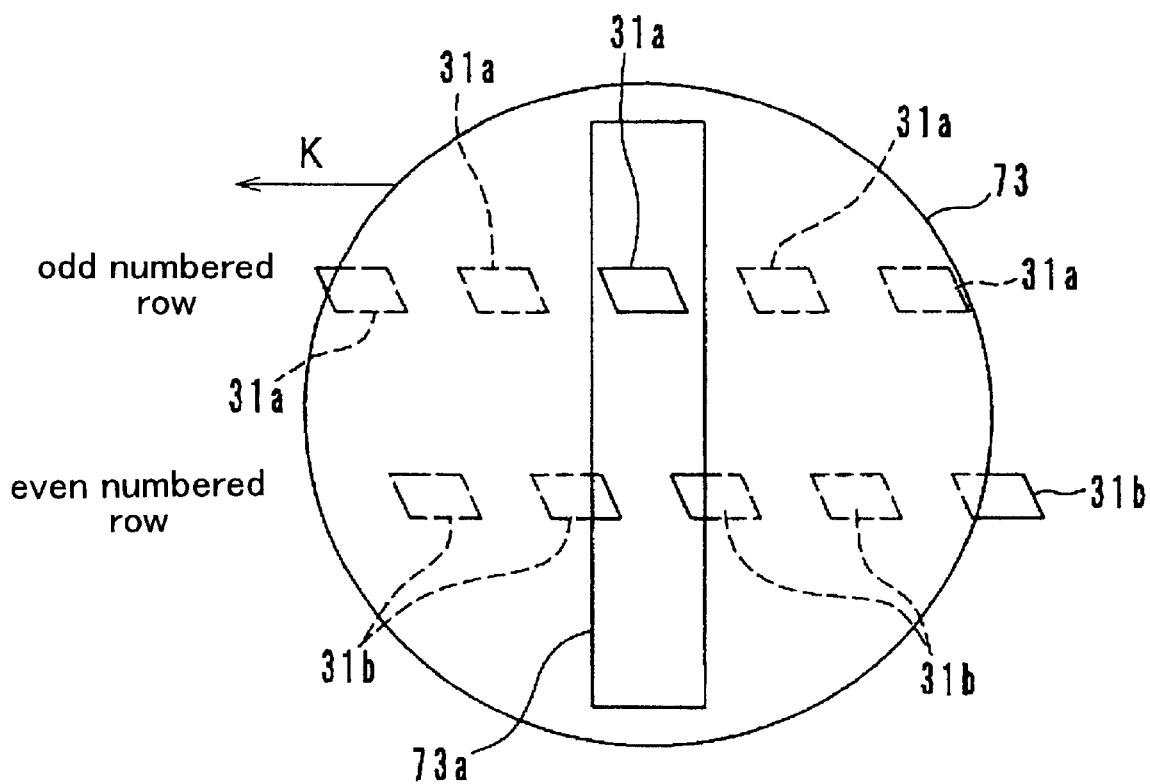
FIG. 3 is a front elevation showing the configuration of the light receiving unit of the light amount sensor.

When this occurs, as shown in FIG. 3, the light receiving unit mask 73 moves in a linear fashion in the direction of the arrow K as the light amount sensor 72 moves forward. An area including a light shutter element 31a of the odd numbered row and an area including a light shutter element 31b of the even numbered row are simultaneously present in the open slit 73a. In synchronization with the drive cycle of the light shutter module 30, the analog switch signal and sample hold single are respectively transmitted to the analog switch 52 and the sample hold circuit 53 shown in FIG. 5, and the light amount signal output from the light amount sensor 72 is sampled. In the case of this embodiment, light amount data during single-row illumination is sampled for each of the three colors, B(blue), G(green) and R(red) (this is deemed one sampling session), followed by sampling of the light amount data during double-row illumination.

The light amount data sampled in this way is temporarily stored in the CPU 43 as recording data for two separate channels, i.e., one set for the single-row illumination channel and another set for the double-row illumination channel in step S2. When the light amount sensor 72 moves a distance slightly longer than the main scanning length, it is determined in step S3 that measuring scan has been ended, and the incorporation of the light amount data is stopped. On the other hand, the light amount sensor 72 that has completed one scanning session moves back to the initial position.

Figure 8:
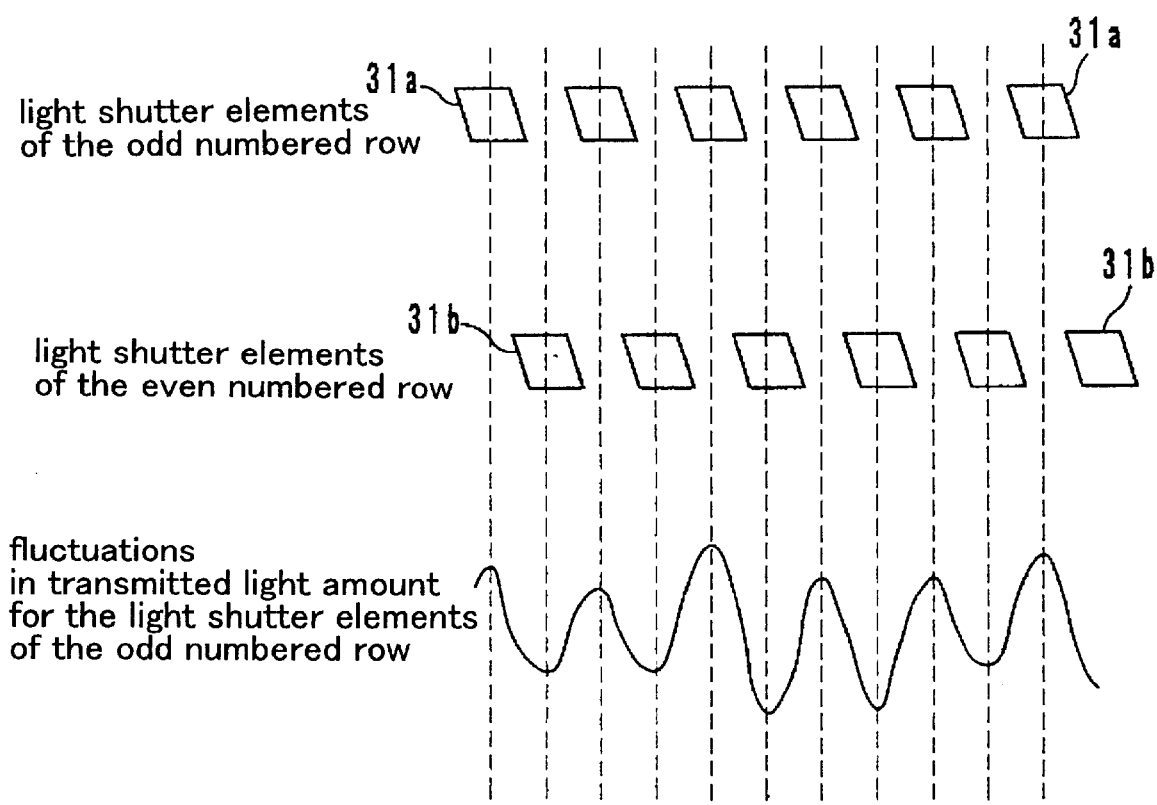
FIG. 8 is a light amount distribution graph showing the fluctuations in transmitted light amount during single-row illumination.

In step S4, the CPU 43 identifies the positions (addresses) of the light shutter elements 31a and 31b from the light amount data during single-row illumination. FIG. 8 is a drawing showing the fluctuations in transmitted light amount for the light shutter elements 31a of the odd numbered row based on the light amount data during single-row illumination. Because the slit 73a that has a width essentially identical to that of the light shutter element 31a is moved in the main scanning direction X during light amount measurement, the maximum light amount (peak light amount) is reached when the light amount sensor 72 faces each light shutter element 31a, and the minimum light amount (trough light amount) is reached when the light amount sensor 72 resides between two light shutter elements 31a. Therefore, by detecting the peaks in the amplitude of the transmitted light amount, the positions (addresses) of the light shutter elements 31a may be identified. The identification of the minimum light amount positions between two light shutter elements 31a (i.e., the positions of the light shutter elements 31b) may be carried out by detecting peaks, as in the case of the maximum light amount positions, but instead, the value of the point at which the maximum light amount is half of its value may be adopted as the position of a light shutter element 31b.

In step S5, the light amount data during the sampling session before or after the sampling session in which the positions (addresses) of the light shutter elements 31a and 31b were identified in step S4, i.e., the light amount data from the other channel (the double-row illumination channel) for the same address is deemed the transmitted light amount for the light shutter elements 31a and 31b during double-row illumination. Strictly speaking, because the light amount sensor 72 has moved by as much as the time for one sampling session (usually several hundred μsec) from the position identified in step S4, an error occurs to that extent. However, this error may be reduced to an essentially insignificant level by appropriately setting the moving speed of the light amount sensor 72.

Figure 9:
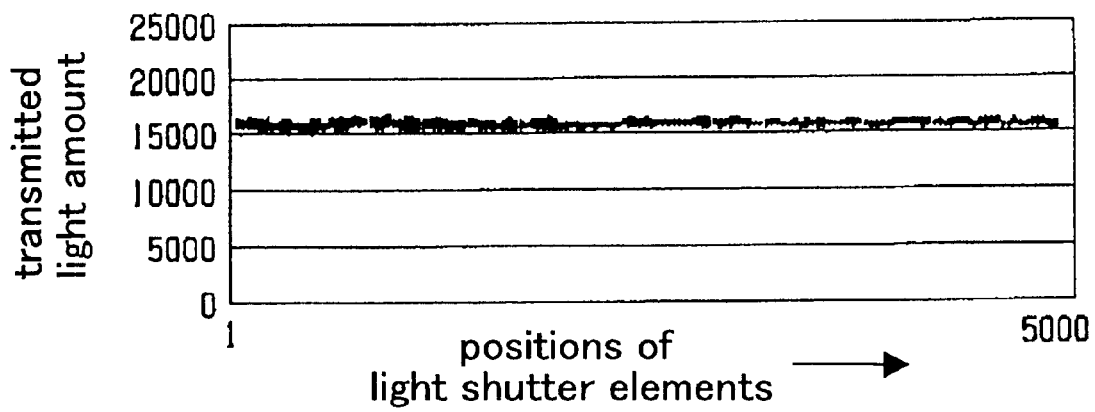
FIG. 9 consists of light amount distribution graphs during double-row illumination after the first correction for variations in light amount is carried out.
Figure 9:
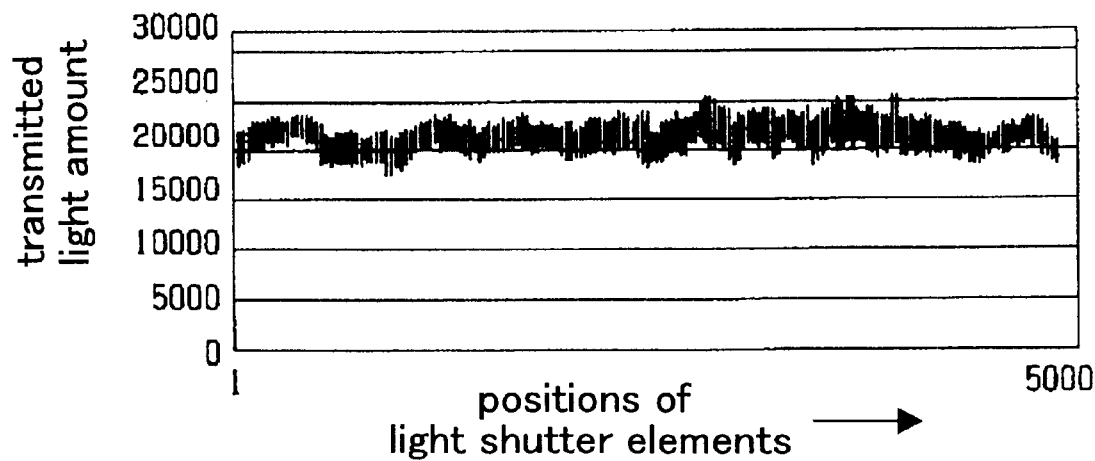

The first session of calculation of shading correction is performed in step S6 from these sets of data. The correction data (light emission exposure time, etc.) for each light shutter element 31a and 31b is obtained in this way. As a result, the positions of the light shutter elements 31a and 31b may be accurately identified without the use of an expensive device such as a linear scale, and the transmitted light amount for each light shutter element 31a and 31b may be measured in a state that is close to double-row illumination, i.e., the state present during actual image exposure. Consequently, high-quality shading correction may be enabled. FIG. 9(A) is a light amount distribution chart during double-row illumination of the optical writing head 20 after the first session of shading correction is performed. For comparison purposes, FIG. 9(B) shows a light amount distribution chart of the optical writing head 20 before the correction is performed.

Figure 10:
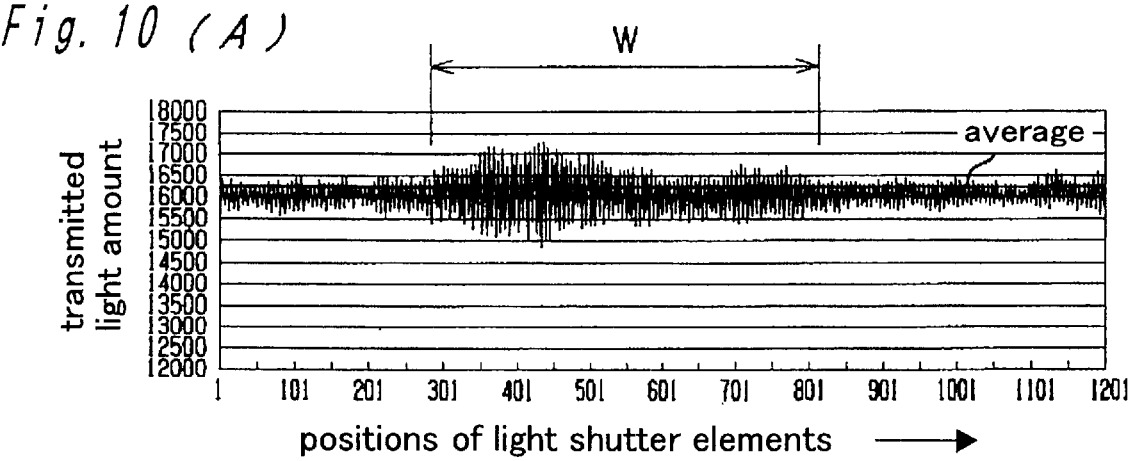
FIG. 10 consists of enlarged light amount distribution graphs during double-row illumination to explain the second correction for variations in light amount.
Figure 10:
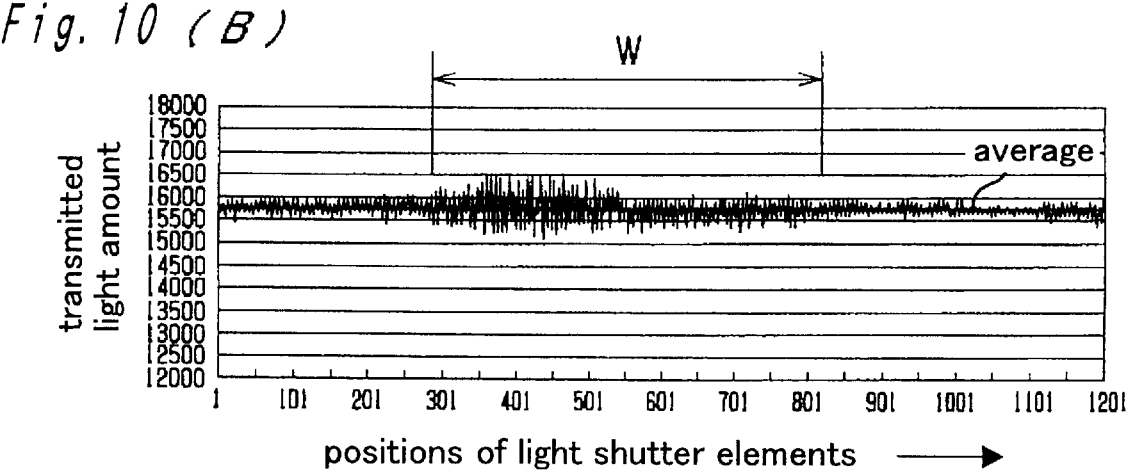
Figure 10:
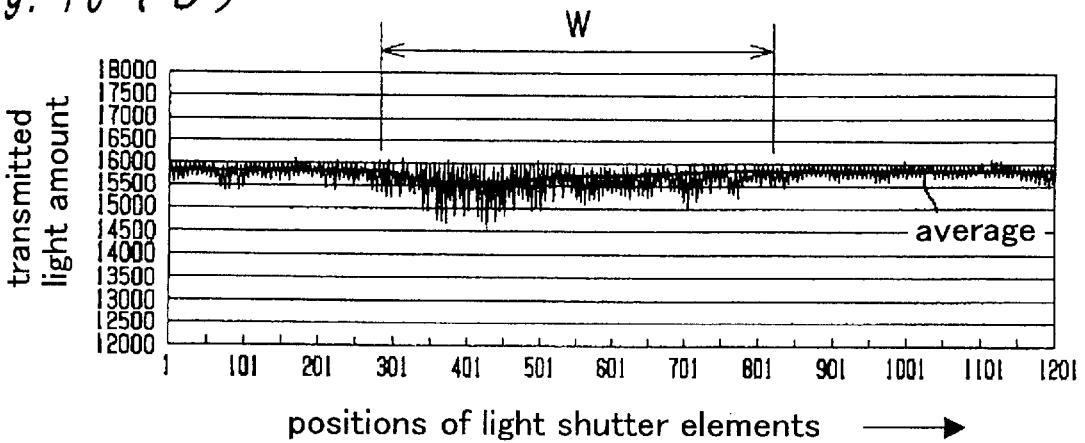

In this way, through the first shading correction, the amplitude (oscillation) of the light amount distribution waveform when both rows are illuminated, which occurs due to the phase difference between the rows of light shutter elements 31a and the rows of light shutter elements 31b caused by the optical performance errors of the selfoc lens array 35, may be reduced. FIG. 10(A) is an enlarged light amount distribution chart of the optical writing head 20 during double-row illumination before any correction is performed. On the other hand, FIG. 10(B) is an enlarged light amount distribution chart of the optical writing head 20 after the first shading correction. The amplitude (oscillation) of the light amount distribution waveform is indeed smaller. However, since the phase difference between the row of light shutter elements 31a and the row of light shutter elements 31b itself is not eliminated, as can be seen from FIG. 10(B), even if adjustments are made to the transmitted light amount for the light shutter elements 31a and 31b that correspond to the oscillation area W, the oscillation itself does not disappear.

On the other hand, generally speaking, where the oscillation area (the area in which the amplitude is large) and uniform areas (the areas in which the amplitude is small) are adjacent to each other or are mixed, the image darkness appears different from area to area to human eyes, even if the areas have the same average darkness. Further the image darkness of each area appears different depending on whether the image area is a dark area or a half-tone area, as well as depending on the color of the image area or the type of the output photosensitive material.

In this example, therefore, the relationships among the amplitude of a prescribed area (the degree of oscillation) and the average darkness and apparent darkness of the output image are sought experimentally in advance, and after the transmitted light amount for each light shutter element 31a and 31b is corrected using the data obtained in the first measurement session, the transmitted light amount for each light shutter element 31a and 31b is measured again, and the correction amount is re-corrected using the above pre-sought relationship. The re-correction method is explained below.

It is determined in step S7 in FIG. 6 whether or not the preset number of shading correction sessions (two in this embodiment) has been reached. Where it has not been reached, step S1 is returned to again for re-correction, and single-row illumination and double-row illumination are alternately carried out a time sharing basis based on the correction data obtained in the first shading correction. Further, after steps S2 through 5S are performed, the output light amount data for each light shutter element 31a and 31b and their position (address) data may be obtained during double-row illumination.

Next, in step S6, the second session of calculation of shading correction is performed. In other words, from the output light amount data for multiple adjacent light shutter elements 31a and 31b, the degree of amplitude (degree of oscillation) of the area formed by these light shutter elements 31a and 31b is detected. Based on this degree of oscillation and on the experimentally pre-sought relationship among the degree of oscillation and the average darkness and apparent darkness of the output image, the calculation to re-correct the correction data (light emission exposure time, etc.) for the light shutter elements 31a and 31b in this area is carried out.

Where it is determined in step S7 that shading correction has been repeated the preset number of times (twice in this example), the re-corrected shading correction data for each light shutter element 31a and 31b is stored in the look-up table memory 44 in step S8.

By re-correcting the shading correction data for the light shutter elements 31a and 31b in this way, relative light amount adjustment of the oscillation area is performed, and a high level of accuracy is obtained in the shading correction (correction for variations in light amount). As a result, high-quality flat images may be obtained. Such relative light amount adjustment for the oscillation area becomes possible only when the transmitted light amount for each light shutter element 31a and 31b during double-row illumination and their positions (addresses) are accurately sought. FIG. 10(C) is an enlarged light amount distribution chart of the optical writing head 20 during double-row illumination after the second shading correction is carried out. FIG. 10(C) is an example in which the output image in the oscillation area W appears darker than the other areas, and the shading correction data is re-corrected such that the transmitted light amount for the light shutter elements 31a and 31b in the oscillation area W is reduced. Conversely, where the darkness of the output image in the oscillation area W appears lighter, the shading correction data is re-corrected such that the transmitted light amount for the light shutter elements 31a and 31b is increased.

Color Printer

Figure 11:
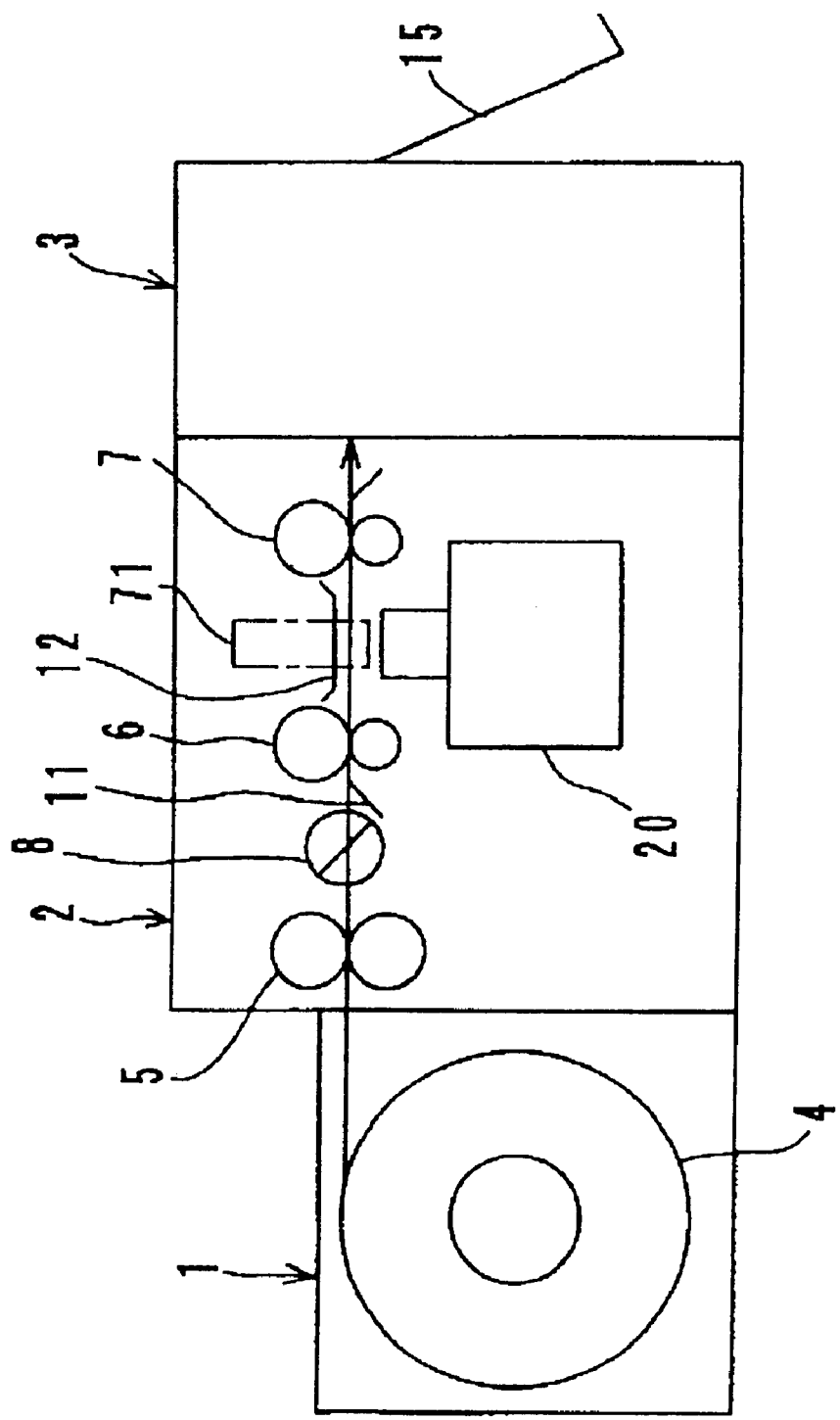
FIG. 11 is a basic construction drawing showing a color printer in which the optical writing device shown in FIG. 1 is mounted.
Figure 12:
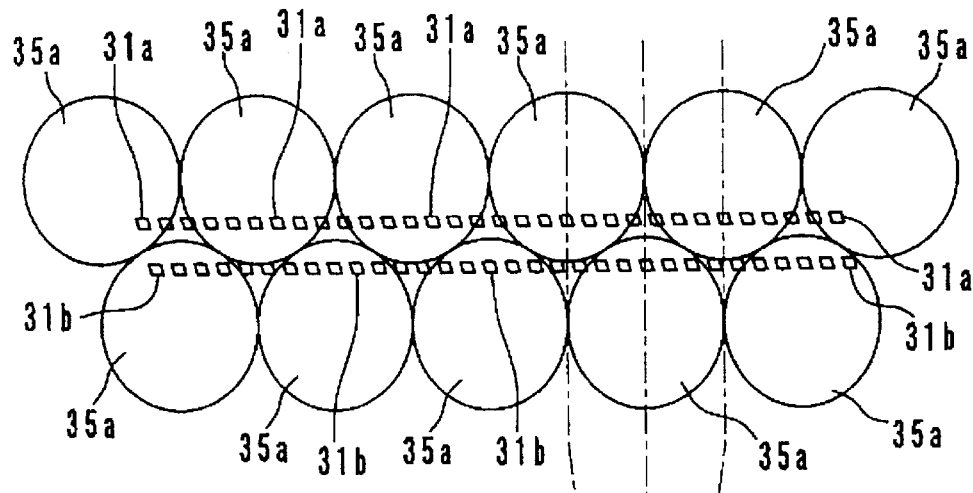
FIG. 12 is a front elevation showing the relationship between the selfoc lens array and the optical elements of the PLZT light shutter array.
Figure 12:
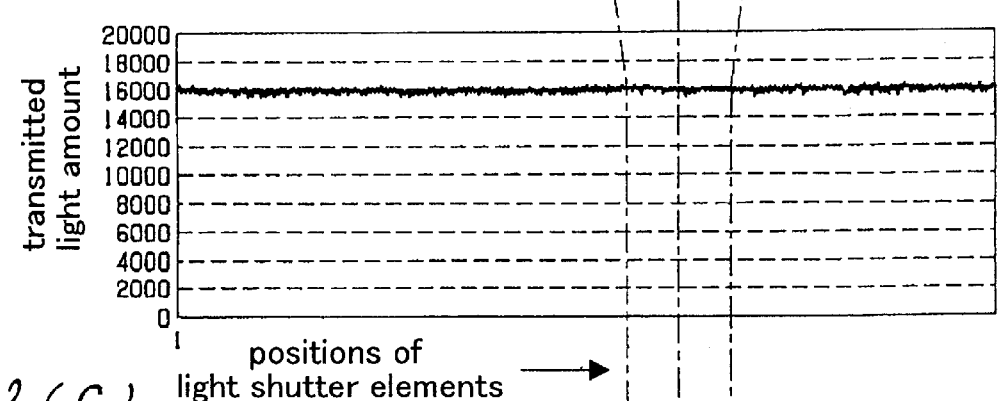
Figure 12:
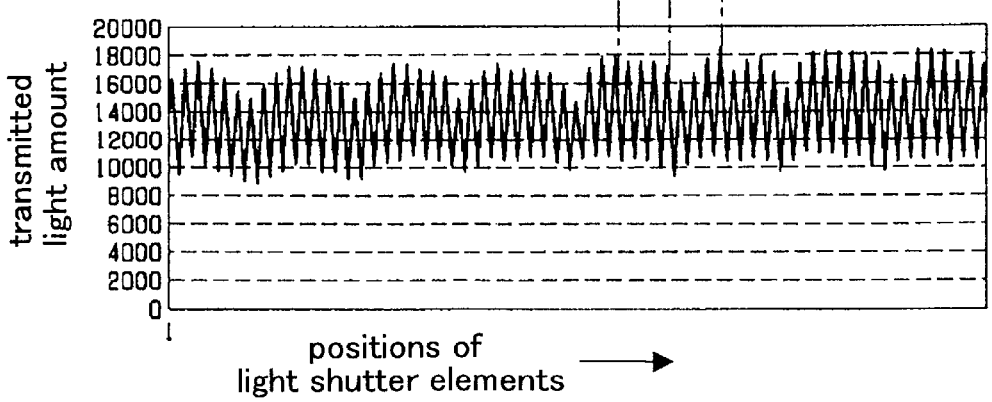
Figure 13:
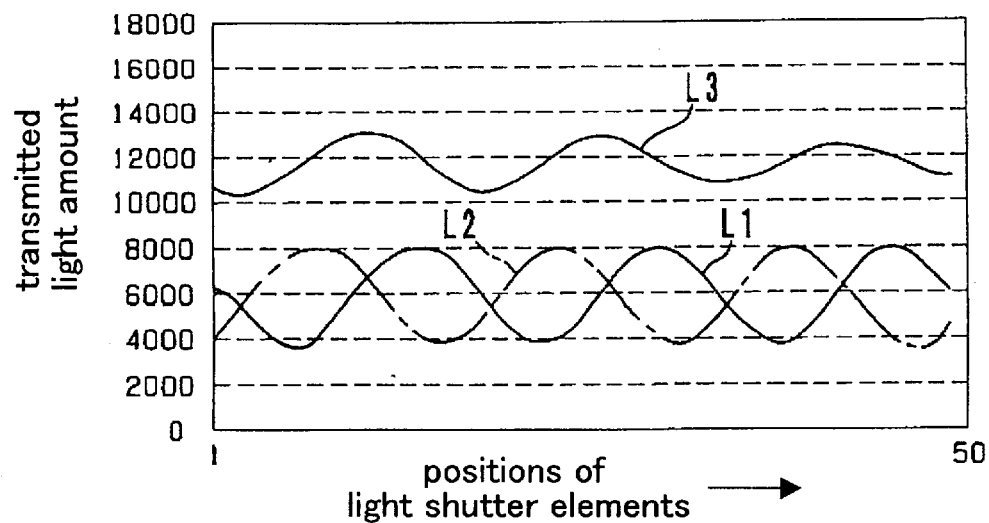
FIG. 13 is a light amount distribution graph to explain the phase difference between the rows of optical elements.
Figure 13:
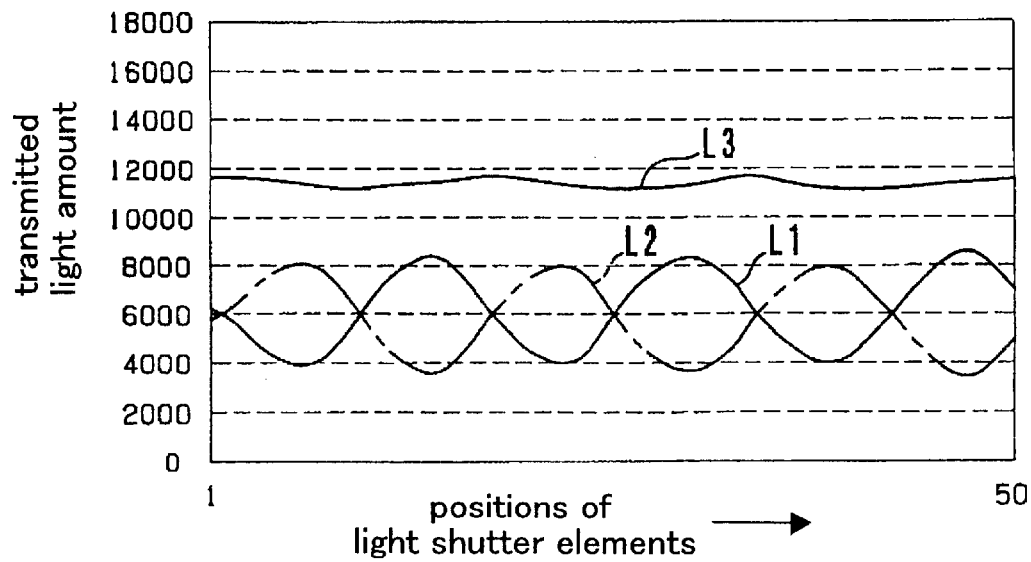

FIG. 11 shows the basic construction of a photo-developing color printer. This color printer comprises a photosensitive paper housing unit 1, an image forming unit 2 and a processing unit 3. The photosensitive paper 4 is housed in the housing unit 1 in a rolled-up fashion. The optical writing head 20 shown in FIG. 1 and the measuring unit 71 shown in FIG. 2 (in which the tool maker's microscope 77, CCD camera 78 and monitor screen 79 are omitted) are mounted in the image forming unit 2. In addition, a pair of conveyance rollers 5, 6 and 7 for the photosensitive paper 4, a cutter 8 and conveyance guide plates 11 and 12 are located in the image forming unit 2.

The photosensitive paper 4 is introduced into the image forming unit 2 by the pair of conveyance rollers 5 with the photosensitive surface facing down, and is cut by stopping the rotation of the pair of rollers 5 when a defined length of the photosensitive paper 4 has been introduced and by operating the cutter 8. The cut piece of photosensitive paper 4 is conveyed by the pairs of rollers 6 and 7 at a constant speed. When the piece of photosensitive paper 4 passes over the optical writing head 20, it is exposed through the opening formed in the guide plate 11, and an image (latent image) is formed. After exposure, the piece of photosensitive paper 4 is developed and dried by the processing unit 3, and is ejected onto the tray 15.

In this color printer, the RGB filter 25 of the optical writing head 20 is rotated so that the light source color is changed at a high speed, and R, B and G images are written for each line by turning ON/OFF the PLZT light shutter elements. Ordinarily, the power to this printer is turned ON by means of a timer, and temperature control for the developer, etc. is carried out. During this warm-up period, light amount measurement and correction (calibration) regarding the light shutter elements are performed. Calibration is a process in which, as described above, the optical writing head 20 is driven under essentially the same conditions as those present when exposure is performed, and light amount correction is carried out based on the output light amount data obtained. Thanks to this process, high-quality graduated images may be obtained without unevenness in darkness. Output of a graduated image is realized by changing the time during which a half-wavelength voltage is applied to each light shutter element. The light amount measurement and correction may be performed at any time other than the printer warm-up period.

Other Embodiments

The solid scanning optical writing device and light amount correction method and light amount measuring device therefor pertaining to the present invention are not limited to the embodiment described above, and may be varied within the scope of the present invention.

In particular, for the optical elements of the solid scanning optical writing device, LEDs (light emitting diodes), LCSs (liquid crystal shutters), FLDs (fluorescent devices) and other devices may be used in place of PLZT.

In addition, an explanation was provided for the above embodiment with reference to the case in which the light amount variation is corrected based on measurement using three colors (R, G, B) in one gradation, but in order to further increase the correction accuracy, measurement data may be obtained using multiple different amounts of light (multiple gradations) by changing the illumination duty for the light shutter elements. It is also acceptable if only one color is selected from among the three colors, and measurement is made for correction of variations in light amount. Further, the first shading correction and the second shading correction in the above embodiment may be repeated where necessary.

In the above embodiment, the light shutter elements 31a of the odd numbered row are illuminated during single-row illumination, but the light shutter elements 31b of the even numbered row may be illuminated instead. In addition, light amount data for single-row illumination may be obtained for each row, so that recording data for a total of three channels, i.e., two single-row illumination channels and one double-row illumination channel, is stored.

Furthermore, the present invention may be applied in an image writing device for silver halide film, or in an electrophotographic photoreceptor or an image projecting device that projects images on a display, in addition to devices that draw images on photosensitive paper using a silver halide material.

Although the present invention bas been fully described by way of examples with reference to the accompanying drawings, it is to be noted that various changes and modifications will be apparent to those skilled in the art. Therefore, unless such changes and modification depart from the scope of the present invention, they should be construed as being included therein.

What is claimed is:

1. A solid scanning optical writing device comprising:
   a plurality of optical elements aligned in an alternating fashion in two rows in a main scanning direction;
   a controller for controlling said optical elements to turn ON/OFF based on image data applied to the optical elements; and
   a light amount measuring unit including a light amount sensor to measure an output light amount for said optical elements, said light amount measuring unit being moveable in the main scanning direction;
   wherein said light amount measuring unit measures the output light amount and a position of each optical element while the controller causes the optical elements to alternately perform single-row illumination and double-row illumination on a time sharing basis while the light amount measuring unit is moved in the main scanning direction.

2. A solid scanning optical writing device as claimed in claim 1,
   wherein said positions of said optical elements are specified from said output light amount data during single-row illumination of the optical elements.

3. A solid scanning optical writing device as claimed in claim 1,
   wherein said controller corrects the image data applied to the optical elements according to said measured output light amount and position of each optical element.

4. A solid scanning optical writing device as claimed in claim 3,
   wherein said controller uses corrected image data to cause the optical elements to alternately perform single-row illumination and double-row illumination on a time sharing basis while the light amount measuring unit is moved in the main scanning direction and while said light amount measuring unit measures another output light amount and another position of each optical element; and
   wherein said controller corrects the corrected image data applied to the optical elements according to said another output light amount and said another position of each optical element.

5. A light amount measuring device comprising:
   a light amount measuring unit including a light amount sensor to measure an output light amount for each of the many optical elements aligned in an alternating fashion in two rows;
   a driver for moving said light amount measuring unit forward and backward in a direction of alignment of the optical elements;
   an adjuster for adjusting a position of said light amount measuring unit; and
   a controller for controlling the measurement of the output light amount and the position of each optical element by alternately performing single-row illumination of the optical elements and double-row illumination of the optical elements on a time sharing basis while the light amount measuring unit is moved in the direction of alignment.

6. A light amount correction method for a solid scanning optical writing device that controls a plurality of optical elements aligned in an alternating fashion in two rows in a main scanning direction to turn them ON/OFF based on image data, said method comprising the steps of:

measuring a position and output light amount for each optical element by alternately performing single-row illumination of the optical elements and double-row illumination of the optical elements on a time sharing basis while a light amount measuring unit, containing a light amount sensor that sends output signals that correspond to the measured output light amount, is moved in the main scanning direction; and calculating a correction amount for said output light amount for each optical element based on data regarding optical element output amount data obtained in said measuring step.

7. A light amount correction method as claimed in claim 6, wherein the output signals from the light amount sensor of the light amount measuring unit are sampled in synchronization with a timing for a pre-programmed drive mode for an optical writing head, and from among the data obtained by means of the sampling, the position of a prescribed optical element is specified from the amplitude of the sampling data when all of the optical elements of a single-row were illuminated, and the data from one sample before or after the sample by which the position of the optical element was specified is deemed said output light amount for the optical element when all of the optical elements of both rows are illuminated.

8. A light amount correction method as claimed in claim 6, further comprising the steps of:

performing double-row illumination of the optical elements based on data corrected by said correction amount obtained in said calculating step;

detecting the difference in output light amount between adjacent optical elements from the output light amount data for each optical element during double-row illumination after correcting in said calculating step; and calculating the correction amount for the output light amount for each optical element based on said difference in output light amount.

9. A light amount correction method as claimed in claim 8, wherein said correction amount for the output light amount for each optical element based on the difference in output light amount is calculated by adding at least one of the following parameters: (i) a visual characteristic of the output image in a dark image area, (ii) a visual characteristic of the output image in a half-tone image area, and (iii) a visual characteristic of an output photosensitive material.

* * * * *